March 17, 1925.
C. W. H'DOUBLER
1,529,741
ARMATURE INSULATING MACHINE
Filed June 19, 1922  4 Sheets-Sheet 1
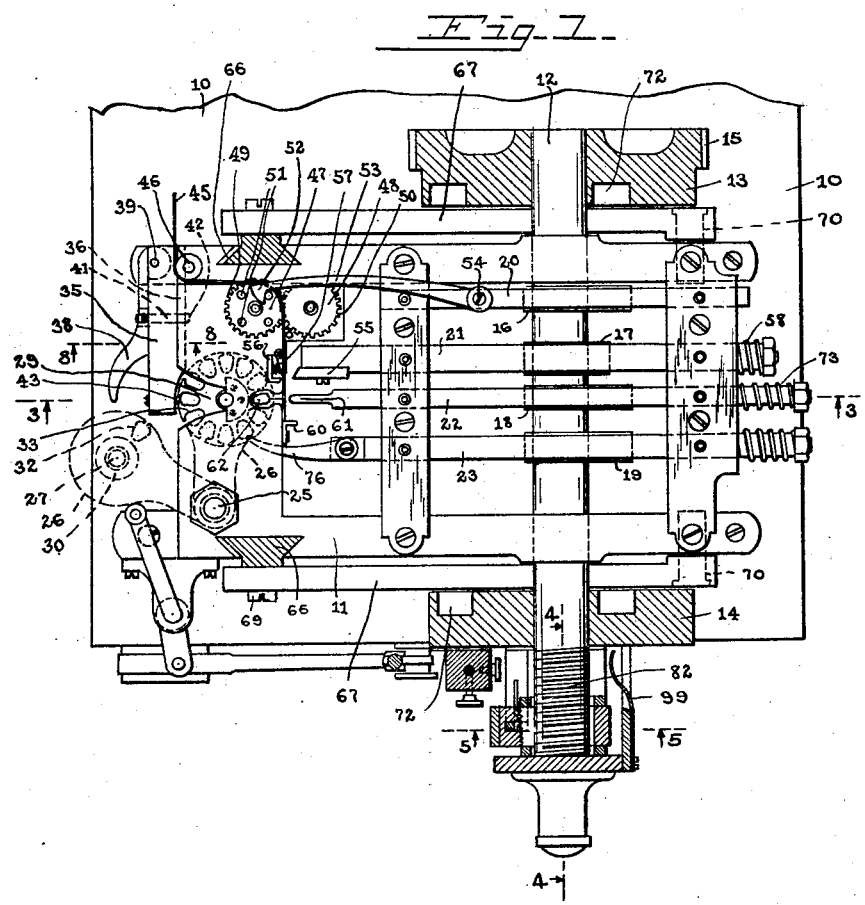
INVENTOR.
Charles W. H'Doubler.
BY Morsell + Keeney,
ATTORNEYS.

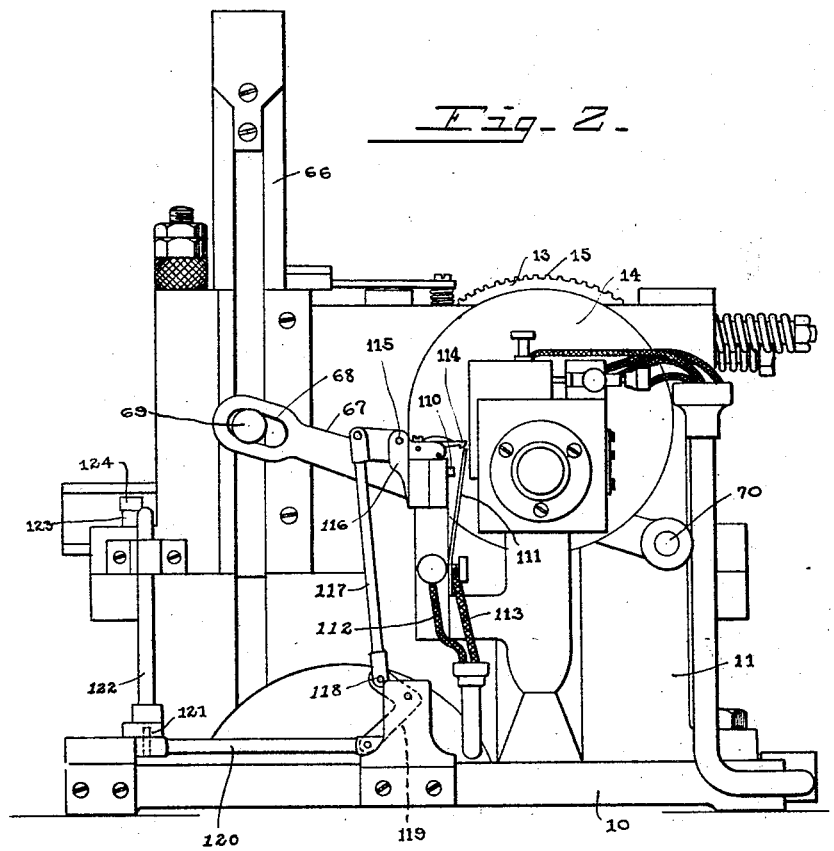

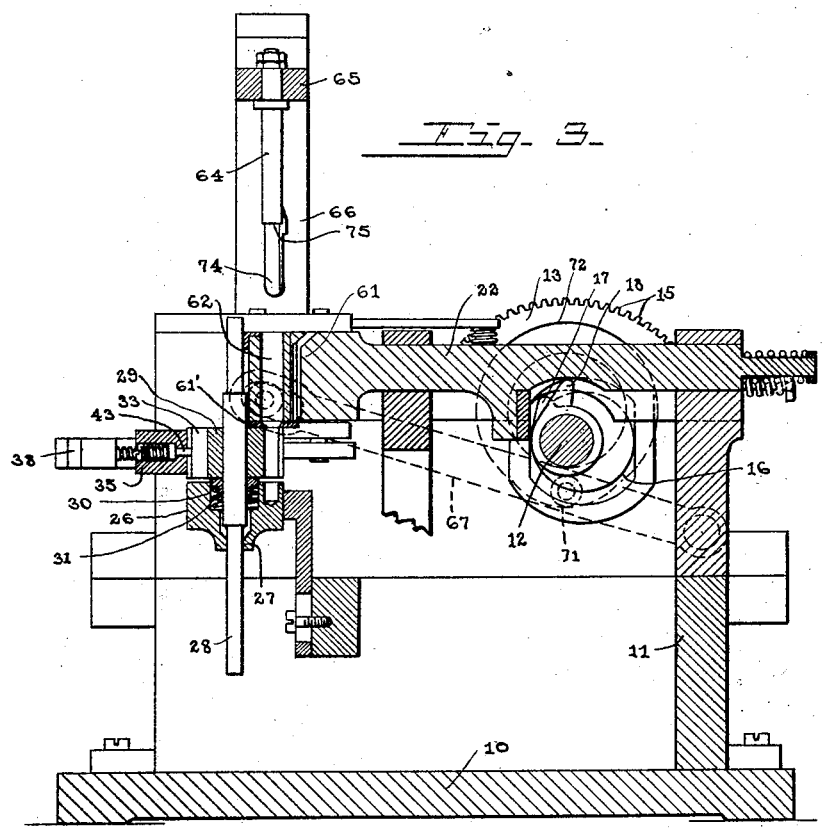

March 17, 1925.
C. W. H'DOUBLER
1,529,741
ARMATURE INSULATING MACHINE
Filed June 19, 1922    4 Sheets-Sheet 4
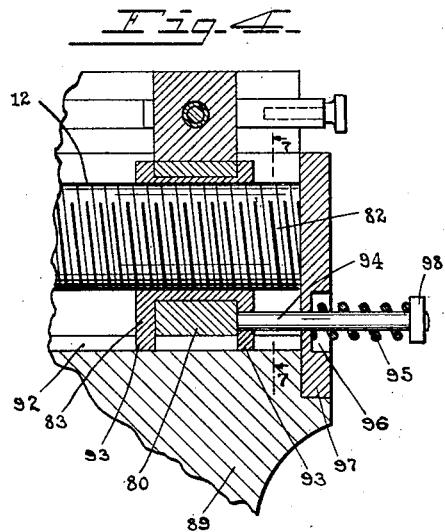
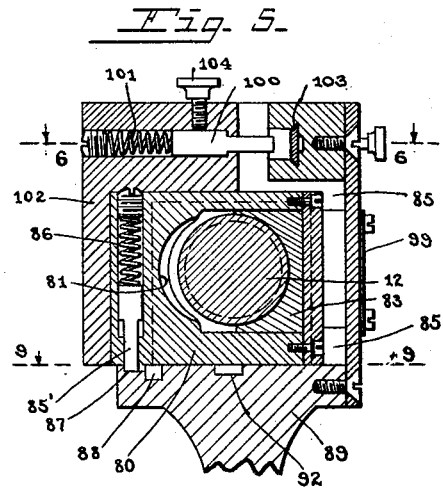
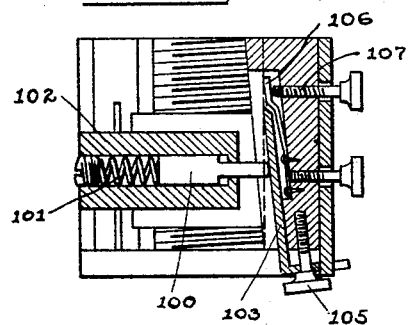
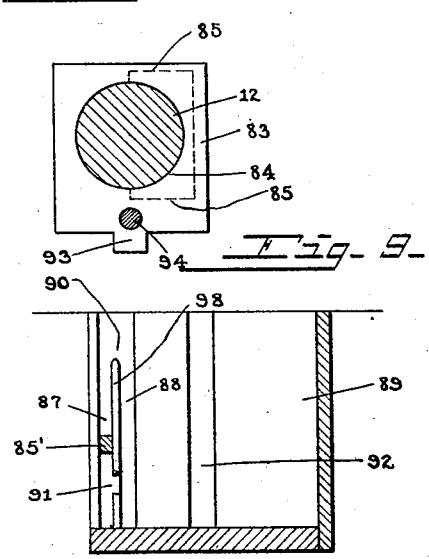
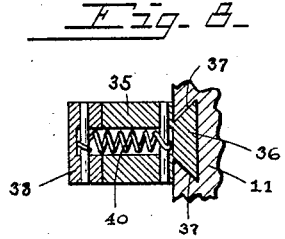
INVENTOR.
Charles W. H'Doubler
BY Morsell + Keeney,
ATTORNEYS.

Patented Mar. 17, 1925.

1,529,741

UNITED STATES PATENT OFFICE.

CHARLES W. H'DOUBLER, OF RACINE, WISCONSIN.

ARMATURE-INSULATING MACHINE.

Application filed June 19, 1922. Serial No. 569,562.

*To all whom it may concern:*

Be it known that I, CHARLES W. H'DOU-BLER, a citizen of the United States, and resident of Racine, in the county of Racine and State of Wisconsin, have invented new and useful Improvements in Armature-Insulating Machines, of which the following is a description, reference being had to the accompanying drawings, which are a part of this specification.

This invention relates to machines for insulating armatures and has for one of its objects to provide an apparatus of this character which will rapidly and efficiently introduce insulating members within the slots or recesses of the usual drum armature cores of electric machines.

In constructing armatures for electric motors and generators it is now the general practice to build up the same from a large number of soft iron or steel stampings which are alternated with similar stampings or punchings of insulating material. These said punchings are of the desired diameter and are provided around their peripheries with the requisite number of slots or recesses to receive the armature wires or conductors.

In some forms of armatures these slots or recesses are substantially circular in cross-section while in others they are more nearly triangular, substantially as illustrated in the accompanying drawings. In either form the enlarged slots or recesses are connected to the exterior of the armature by means of restricted throats or passages through which the wires or conductors may be introduced one at a time.

It is also customary to insulate these said slots or recesses by lining them with suitable insulating material, generally in the form of sheet material, such as oiled silk, fish paper, and the like, but so far as I am aware, this operation has always been carried out by hand up to the present time.

This manual lining of the slots of necessity requires a great deal of time and is more or less expensive, and it is therefore desirable to provide some means by which the same result may be attained by the use of machinery and it is the primary object of this invention to provide an apparatus which will rapidly form and introduce the insulating linings into the slots of the armature cores.

With the above and other objects in view which will appear as the description proceeds, the invention consists in the novel details of construction and combinations of parts more fully hereinafter disclosed and particularly pointed out in the claims.

Referring to the accompanying drawings in which like numerals designate like parts in all the views;

Figure 1 is a plan view, partly in section, of a machine made in accordance with the present invention for forming and introducing linings into the slots of armature cores;

Fig. 2 is a side elevational view of the parts shown in Fig. 1;

Fig. 3 is a central vertical sectional view taken approximately on the plane indicated by the line 3—3 of Fig. 1;

Fig. 4 is a fragmentary transverse vertical sectional view on an enlarged scale of the automatic switch control mechanism, the said view being taken approximately on the plane indicated by the line 4—4 of Fig. 1;

Fig. 5 is a view at right angles to Fig. 4, taken approximately on the plane indicated by the line 5—5 of Fig. 1;

Fig. 6 is a sectional plan view taken on the plane indicated by the line 6—6 of Fig. 5;

Fig. 7 is a sectional elevational view taken on the plane indicated by the line 7—7 of Fig. 4;

Fig. 8 is a detail cross-sectional view through the pivoted lock which retains the armature in a predetermined position, said view being taken on the plane indicated by the line 8—8 of Fig. 1; and Fig 9 is a horizontal sectional plan view, taken on the plane indicated by the line 9—9 of Fig. 5.

Referring more particularly to Figs. 1, 2, and 3, the numeral 10 indicates a base to which is secured in any suitable manner the upright frame 11 in which is journaled the main drive shaft 12, carrying the cam members 13 and 14, the former of which is provided with gear teeth 15 which mesh with the teeth of a gear or pinion carried by any suitable driving motor, not shown.

The said cam members 13 and 14 are carried by the said shaft 12 adjacent its two ends and the said shaft carries intermediate the said cams additional cam members 16, 17, 18, and 19, which control respectively the movements of a member 20 which feeds the insulating material, a member 21 which cuts the insulating material into predetermined lengths, a member 22 which forms the cut lengths of insulating material into suitable shapes to be introduced into the armature slots, and a member 23 for feeding and positioning the armature itself in proper relation to the other parts to receive the insulating members, all as will be more fully described below.

Pivoted vertically to the framework 11, as at 25, is an armature receiving and supporting arm 26, the outer end of which is provided with a bore 27 adapted to receive the shaft 28 of the armature 29, which is being insulated. The said arm member 26 is also provided with a counterbore 30 accommodating the spring-pressed plug or plunger 31 upon which the armature 29 is adapted to rest, all as will more fully appear below.

The said supporting arm 26 is also provided with the aperture or hole 32 adjacent the edge thereof, which hole is of a shape substantially the same as the cross-section of the slots 33 within the armature core 29. A lock member 35 is slidably mounted upon the frame 11 by means of a dove tail slide member 36 which moves in the similarly shaped guide-way 37 with which the said frame 11 is provided and the said lock member carries a lever or handle 38 pivotally secured thereto as at 39 and normally held in close engagement with the face of the lock member 35 by means of a tension spring 40, see Figs. 1 and 8.

The said lever 38 carries a pivoted pin 41 which slides in a hole within the body of the lock member 35, its free end being adapted to engage a recess 42 within the said frame 11 whereby the sliding movements of the lock member 35 may normally be prevented. The said lock member also carries at one end a spring pressed pin 43 provided with a bevelled surface at its extreme end which end is adapted to engage the throats of the armature slots and to thereby lock the armature in position for receiving the insulating members.

The insulating material 45 which may be oiled silk, fish paper, or the like, is supplied from any suitable source, as from a roll, not shown, supported upon the base 10 and it passes around the guide roll 46, thence to a pair of feeding rollers 47 and 48, the ends of which are provided with the gear teeth 49 and 50, respectively, intermeshing with each other, whereby the said rollers may be simultaneously actuated. The roller 47 carries at one end a plurality of pins or projections 51 which are adapted to be engaged by the hook end 52 of the arm 53 which is pivotally secured as at 54 to the member 20 above described. It thus results that as the cam 16, which is a positive cam, reciprocates the member 20 the latter will move the arm 53 back and forth so that the hook 52 thereof will successively engage the pins 51 to intermittently feed the insulating material by means of the feed rollers 47 and 48 to the cutting mechanism which will now be described.

The said cutting mechanism comprises a cutter member 55 carried by the sliding member 21, above described, which cutter member 55 is adapted to coact with a stationary cutting edge 56 to sever the insulating material 45 into predetermined lengths. The said stationary cutting member 56 is provided with a pivoted gate or guide member 57 which is normally pressed outwardly by means of a spring in order that the said insulating material may be properly fed thereto.

This gate 57 is engaged by the movable cutter member 55 during the severing action and pressed inwardly and is returned to its original position by means of the said spring when the said cutter member 55 is retracted under the influence of the spring 58 upon its release by the cam 17.

The insulating material is fed by means of the feed rollers 47 and 48 between the separated cutter members 55 and 56 until its free end engages the stop member 60, whereupon the cutting member 55 is moved toward the member 56 to sever the said insulating material into predetermined lengths and, as soon as this action is accomplished the cam 18 moves the forming member 22 to the left, as seen in Fig. 1, so that its extreme end 61 engages the separated portion of the insulating material 45 and forces it into the forming chamber 62.

This chamber, which is located directly above the armature 29, is substantially U-shaped in cross-section so that the said insulating material is caused to assume a substantially U-shaped or horse-shoe shaped cross-section in a position directly above one of the armature slots 33.

The plunger member 64 is carried by a cross-head 65 which is mounted for vertical sliding movement in the frame 11 by means of the dove tail slide members 66, which members are adapted to be actuated by means of the arms 67 provided with the elongated slots 68 engaging the pins 69 carried by the said slide member 66, as will be clear from Figs. 1 and 2 of the drawings. The other ends of the said arms 67 are pivoted as at 70 to the frame 11 and the said arms carry rollers 71 which engage the cam grooves 72 with which the cam members 13 and 14, above described, are provided.

Just beneath the forming chamber there are two little guiding gates 61'—61' which open and close sliding in grooves cut at right angles to the forming chamber on the under side. These two gates 61'—61' meet on a line exactly in the center of the forming chamber and are held resiliently in that position by two strong flat springs, one back of each gate. There is an opening between the gates one-half of which is cut from each gate. This opening is smaller at the bottom than the cell in the armature, but of same shape, and is gradually enlarged toward the top to the exact size of the forming chamber, making the sides of the opening in the gates funnel shaped.

Now as the insulating material is forced downward by the plunger, these gates open slightly as they pinch the end of the insulation inward enough that it enters the top opening of the armature cell freely, but keep a constant pressure against it as it passes through.

The parts are so designed and constructed that as soon as the forming member 61 has completed its approximate forming operation in conjunction with the forming chamber 62 and is retracted by its spring 73 the cam grooves 72 of the cam members 13 and 14 will actuate the arms 67 to move the slide members 66, cross head 65, and plunger 64, downwardly so that the lower end 74 of said plunger will enter the formed insulating member until the shoulder 75 of the said plunger engages the upper end of the said insulating member. Continued downward movement of the plunger 64 will now force the horse-shoe shaped member between the gates 61' which will guide the insulating member into the armature slot which is in register with the gates and the bottom of the forming chamber 62 until its lower end edge projects slightly beyond the lower surface of the armature 29 and will shape said member to fit said slot.

Further downward movement of the cross-head 65 will cause the shoulder 75 of the plunger 74 to engage the upper edge of the material and press the armature downward slightly against the compression of the spring controlling the plug 31 and causing the protruding lower end edge of the insulating material to engage the upper surface of the arm 26 surrounding the recess 32 and to be crimped over the end of the armature, thereby locking the same in place against endwise movement. The upper end of the said material has likewise been crimped in the meantime by means of the shoulder 75 and as soon as the operation is completed the cam grooves 72 cause the arm 67 to start the slides 66, cross head 65, and plunger 64 upon their upward stroke to return them to their original positions.

One slot having thus been insulated, continued rotation of the shaft 12 will cause the cam 19 to move the feeding or positioning member 23 to the left, as seen in Fig. 1, whereby its pivoted finger member 76 will be caused to engage the throat of one of the armature slots to impart rotary movement to the armature core in a clockwise direction, as seen in Fig. 1, to the end that the insulated slot may be moved out of register with the forming chamber 62 and the next uninsulated slot moved into position thereunder.

The movement of the said armature about its axis is permitted by the pin 43 due to the bevelled surface, above described, which causes the said pin to be forced backwardly against the compression of the controlling spring until the throat of the next slot is in register therewith, whereupon the said pin snaps back into its operative position and prevents further unintentional rotation of the armature during the succeeding operations.

When all of the slots have thus been insulated the pivoted lever 38 of the locking member 35 is manually swung about its pivot 39 to disengage the locking pin 41 from its recess 42 whereupon the said locking member may be slid in its guide-ways 37 out of line with the armature and the latter together with the supporting arm 26 may be swung about the pivot 25 to the position illustrated in broken lines in Fig. 1, whereupon the armature may be removed and a new one substituted. The parts are then restored to the positions illustrated in the said figure and the operation is repeated.

In order to semi-automatically control the operations of the machine there is provided an automatic switch device which is connected to the motor which drives the gear 15 whereby its action may be controlled. This switch mechanism may be of any desired form but is here shown as comprising the member 80 manually movable toward the right, as viewed in Figs. 1 and 5, and provided with mutilated threads 81 which are adapted under certain conditions to engage threads 82, cut upon the extreme end of the shaft 12.

A supporting member 83 surrounds the said shaft 12, as is best shown in Figs. 4, 5, and 7, and is provided with apertures 84 through which the said shaft may freely move. The said member is also provided with transverse grooves or guide-ways 85 in which is mounted the member 80 whereby the latter may be moved transversely with respect to the shaft 12 to engage and disengage the mutilated threads 81 with the shaft threads 82, as will be readily apparent.

The member 80 carries a vertical pin or plunger 85' which is controlled by means of a spring 86 and the lower end of which engages a pair of grooves or guide-ways 87 and 88, cut in an extending arm 89 with which the frame 11 is provided. The said groove 88 is of a substantially constant depth throughout its entire length while the bottom of the groove 87 is inclined somewhat, at one end 90, being in the same plane as the bottom of the groove 88, while at its other end it is somewhat higher than the bottom of the groove 88. At this said high end it is connected by means of a transverse groove 91 with the said groove 88 to the end that the pin 85 may be transferred from one groove to the other, as will appear more fully below.

The arm 89 is also provided with a third groove 92 which is adapted to accommodate the tooth or projection 93 with which the member 83 is provided to guide the latter, as will be readily apparent.

The member 83 carries a horizontally extending pin 94 which is surrounded by a coil spring 95 one end of which is positioned within a recess 96 in a plate 97 rigidly secured to the extension 89, and the other end of the said spring abuts the nut or head 98 with which the said rod 94 is provided.

From what has been thus far disclosed it will be apparent that if the member 80 is manually moved to the right, as seen in Fig. 5, so that its mutilated threads 81 engage the threads 82 of the shaft 12, upon rotation of the latter the nut member 80 will be moved longitudinally of the said shaft, or toward the left, as seen in Fig. 4. During this movement the pin 85 travels in the groove 88 and the movement will continue until the said pin reaches the point 90 where it is disengaged from the rib 88' which separates the two grooves 87 and 88 at which point the nut member 80 will engage the curved spring member 99, see Figs. 1 and 5, which will force the said nut toward the left, as seen in the said figures thereby disengaging the said threads 82 of the shaft 12. This transverse movement will move the pin 85 to the left, as seen in Figs. 5 and 9, until it engages the groove 87 whereupon the spring 95 will act to return the parts to the right, as seen in Fig. 4, until the pin 85 is in alignment with the transverse cutaway portion 91, when the parts may be again manually moved toward the right, as viewed in Fig. 5, to engage the threads 81 and 82.

This longitudinal movement of the nut member 80 controls contacts which are connected to the motor circuit and also to a suitable magnetic brake whereby the said motor may be stopped and started and the said brake applied and released. One of these said contacts 100 which is controlled by a spring 101 is carried by an insulating block 102 secured to the traveling nut member 80 and the said contact 100 is adapted to engage an inclined contact member 103, see Figs. 5 and 6. These members are connected by means of the screws 104 and 105 respectively, in the motor circuit, so that immediately upon their engagement the motor will be started and the operations of the machine carried on as above described to their completion whereupon the nut 80 will have moved a sufficient distance to cause the contact member 100 to slide off the upper end, as seen in Fig. 6, of the contact member 103, thereby breaking the motor circuit and stopping the latter. When this occurs the said contact member 100 engages a spring contact member 106 and causes it to contact with a stationary contact member 107, which latter pair of members are included in circuit with an electromagnetic brake, not shown, whereby the rotation of the shaft 12 may be partially stopped.

The action of this brake is only momentary, however, since at this point the nut member 80 will have engaged the spring 99 which will throw it to the left, as seen in Figs. 1 and 5, thus disengaging its threads 81 from the threads 82 and permitting the spring 95 to retract the same. Of course as the said member moves to the left, as just mentioned, its contact member 100 may be moved out of engagement with the member 106 and the braking circuit is thus broken.

An additional brake is provided which is controlled by a switch mechanism mounted upon the side of the framework 11 and which is best shown in Figs. 1 and 2. This mechanism comprises the contact points or members 110 and 111 which are connected respectively to the electric feed wires 112 and 113, see Fig. 2. These contact members may be controlled in any suitable manner, as for example by means of the hook member 114 which is pivoted as at 115 to a bracket 116 and is adapted to be actuated by means of a link 117 pivoted as at 118 to one arm of a bell crank lever 119 the other arm of which is connected to the link 120 controlled by a crank pin 121 carried by the vertically extending rod 122 provided at its upper end with a crank arm 123 carrying a roller 124 adapted to be engaged and moved by the armature supporting arm 26 in its swinging movements. The parts just described may be returned to their initial positions by means of a spring or in any suitable manner.

It will thus be seen that this invention provides an apparatus for rapidly and efficiently forming the insulating members for the slots of armature cores and for introducing the said members into said slots and securing them therein. Furthermore the operations of the machine, after it is once started by the manual movement of the switch block 80 into engagement with the threads 82 of the shaft 12, are entirely automatic so that the operations may be carried out quite rapidly.

It is obvious that those skilled in the art may vary the details of construction as well as the arrangement of parts without departing from the spirit of the invention, and therefore it is not wished to be limited to the above disclosure except as may be required by the claims.

What is claimed is:

1. An apparatus of the class described comprising means for shaping an insulating member to conform substantially to the shape of an armature core slot; and means for introducing said member into said slot.

2. An apparatus of the class described comprising means for shaping an insulating member to conform substantially to the shape of an armature core slot; and means for introducing said member endwise into said slot.

3. An apparatus of the class described comprising automatic means for shaping an insulating member to conform substantially to the shape of an armature core slot; and automatic means for introducing said member endwise into said slot.

4. An apparatus of the class described comprising means for severing a length of insulating material; means for shaping said material to conform substantially to the shape of an armature core slot; and means for positioning said shaped material within said slot.

5. An apparatus of the class described comprising automatic means for severing a length of insulating material; automatic means for shaping said material to conform substantially to the shape of an armature core slot; and automatic means for positioning said shaped material within said slot.

6. An apparatus of the class described comprising automatic means for severing a length of insulating material; means for feeding said material to said severing means; automatic means for shaping said material to conform substantially to the shape of an armature core slot; and automatic means for positioning said shaped material within said slot.

7. In an apparatus of the class described the combination of cam controlled means for shaping an insulating member to conform substantially to the shape of an armature core slot; and cam controlled means for introducing said member into said slot.

8. In an apparatus of the class described the combination of cam controlled means for severing a predetermined length of insulating material; means for intermittently feeding said material to said severing means; cam controlled means for shaping an insulating member from said severed length to conform substantially to the shape of an armature core slot; and cam controlled means for introducing said member into said slot.

9. In an apparatus of the class described the combination of means for supporting an armature core; means for shaping a slot-insulating member adjacent the end of said core; and cam controlled means for moving said member endwise into a slot of said core.

10. In an apparatus of the class described the combination of means for supporting an armature core; means for shaping a slot-insulating member adjacent the end of said core; cam controlled means for moving said member endwise into a slot of said core; and means for intermittently moving said armature to bring other slots in register with said shaping means.

11. In an apparatus of the class described the combination of means for rotatably supporting an armature core; automatic means for shaping a slot-insulating member adjacent the end of said core; automatic means for moving said member endwise into a slot of said core; and automatic means for intermittently rotating said armature to bring successive slots into register with said shaping means.

12. In an apparatus of the class described the combination of means for rotatably supporting an armature core; automatic means for severing a predetermined length of insulating material; automatic means for intermittently feeding said material to said severing means; automatic means for shaping a slot-insulating member from said severed length adjacent the end of said core; automatic means for moving said member endwise into a slot of said core; and automatic means for intermittently rotating said armature to bring successive slots into register with said shaping means.

13. A machine of the class described comprising means for supporting an armature core; a forming chamber located adjacent one end of said core; a plunger member adapted to enter said chamber to shape a slot-insulating member therein; and a reciprocating plunger for engaging one end of said insulating member and moving it endwise into a slot of said core.

14. A machine of the class described comprising means for supporting an armature core; a forming chamber located adjacent one end of said core; means for feeding a strip of insulating material in front of said chamber; means for severing a portion of said strip; a plunger member adapted to cause said severed portion to enter said chamber to shape a slot-insulating member therein; and a reciprocating plunger for engaging one end of said insulating member and moving it endwise into a slot of said core.

15. A machine of the class described comprising means for rotatably supporting an armature core; a forming chamber located adjacent one end of said core; means for intermittently feeding a strip of insulating material in front of said chamber; means for severing a portion of said strip; a plunger member adapted to force said severed portion into said chamber to form a slot-insulating member; means for yieldably holding said armature against rotation; and means for automatically moving said armature to bring successive slots into register with said chamber.

16. An apparatus of the class described comprising means for introducing an insulating member into an armature core slot and shaping said member to fit said slot.

17. An apparatus of the class described comprising means for introducing an insulating member into an armature core slot and shaping said member to fit said slot and lock the member against endwise movement.

In testimony whereof, I affix my signature.

CHARLES W. H'DOUBLER.